F. PHILLIPS.
TRAP.
APPLICATION FILED AUG. 28, 1919.
1,391,577. Patented Sept. 20, 1921.
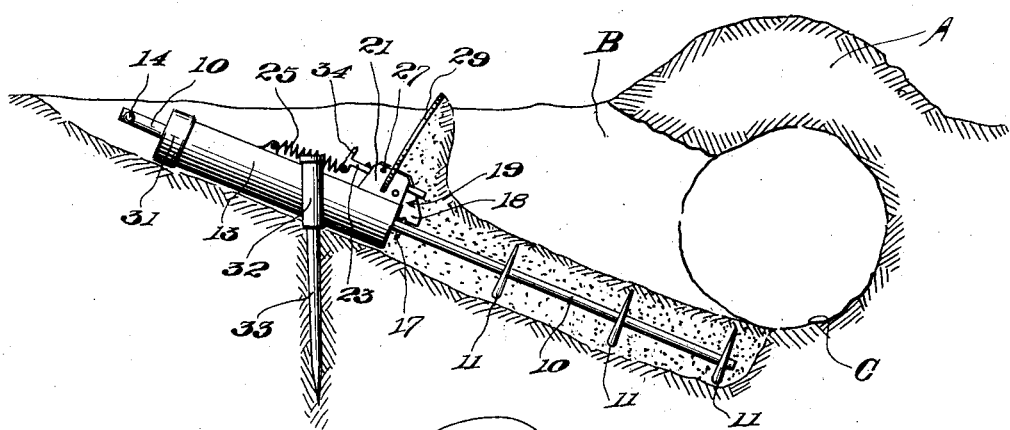
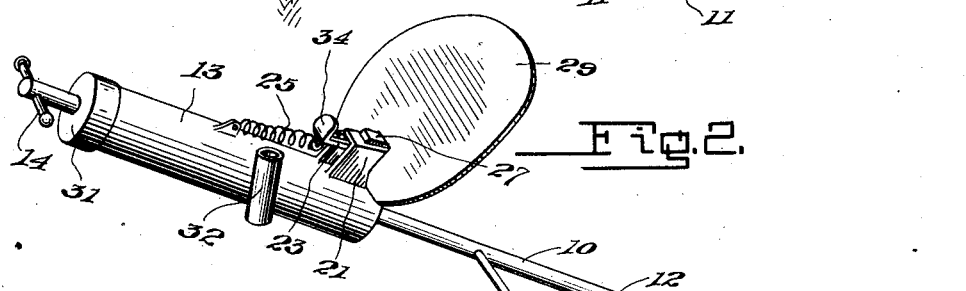
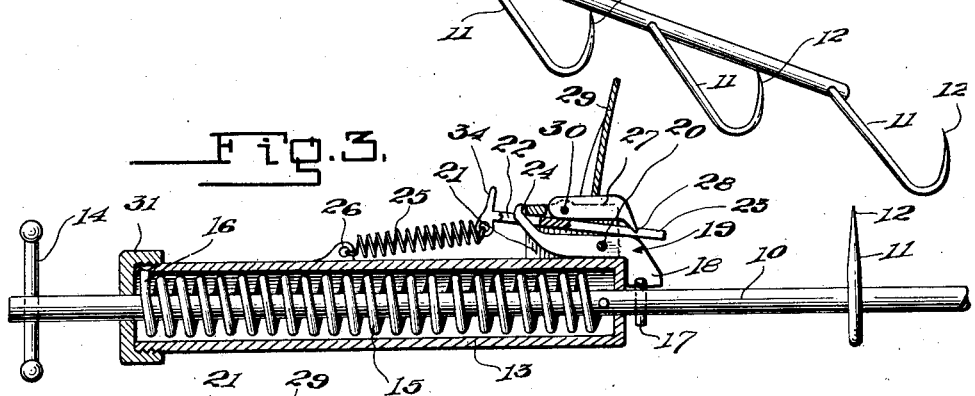
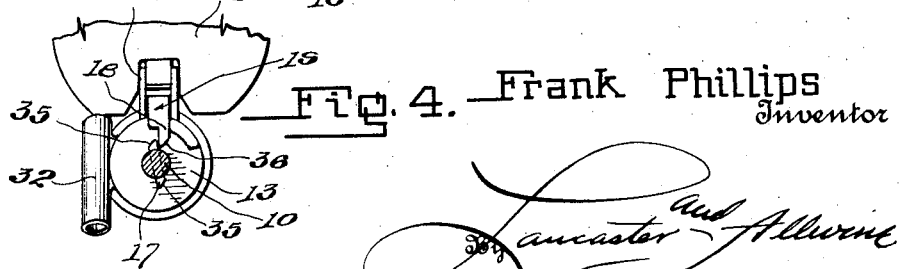
Frank Phillips, Inventor

UNITED STATES PATENT OFFICE.

FRANK PHILLIPS, OF FORT CROOK, NEBRASKA.

TRAP.

1,391,577.     Specification of Letters Patent.     Patented Sept. 20, 1921.

Application filed August 28, 1919. Serial No. 320,385.

*To all whom it may concern:*

Be it known that I, FRANK PHILLIPS, a citizen of the United States, residing at Fort Crook, in the county of Sarpy and State of Nebraska, have invented certain new and useful Improvements in Traps, of which the following is a specification.

This invention relates to traps, particularly designed for catching gophers or analogous rodents, and an object of the invention is to provide a trap which includes a plurality of piercing members movable in a rotary manner from one side over and down upon the gopher tripping the trap for piercing the gopher and consequently catching and killing him.

A further object of the invention is the provision of a gopher trap particularly designed for use in catching the gopher during his work. It is a known fact that when the runway or tunnel of a gopher has been tampered with or opened, as soon as the gopher discovers such opening he will immediately set forth to fill it up, and while this fact is utilized to a great extent in endeavors to catch gophers in various types of traps now in use, the said traps are of such construction that they will either become clogged with the loose dirt which the gopher pushes in front of him or they will be conspicuous so as to warn the gopher of their presence, making him wary and causing him either to abandon the portion of his runway or tunnel adjacent the opening, digging around in another way, or to fill in about the trap leaving the latter unmolested and also preventing his being caught.

It is an object of this invention to provide a gopher trap which will overcome the inconveniences and disadvantages of traps, as above specified, by providing a trap which may be hidden by loose dirt, the said dirt in no way interfering with the efficient operation of the trap, and also to provide a trap which may be operated by the dirt pushed ahead of the gopher as it is a well known fact that in repairing a broken open tunnel or hole the gopher always pushes the dirt in front of him which is also a disadvantage for the use of various types of traps, in that he will trip the trap with the dirt, leaving himself free, however, the trap embodied in the present invention comprises gopher piercing means arranged to pierce the gopher when the trip mechanism thereof is operated by the dirt which is pushed in front of the gopher while working.

More specifically, the invention comprehends the provision of a trap including a rod having a plurality of radially extending tines or jaws thereon, the free ends of which are arcuated and sharpened to form piercing points, and to connect the spring to the said rod, which spring is adapted to be wound so that when released it will impart a rotary movement to the rod for moving the piercing point into an animal engaging and piercing position, and further to comprehend the provision of a novel trip structure for holding the trap set, that is, holding the spring under tension, which trip structure is adapted to be operated by pressure against a trip pan, for releasing the spring to permit it to rotate the jaw carrying rod.

Other objects of the invention will appear in the following detailed description taken in connection with the accompanying drawings, forming a part of this specification, and in which drawing:

Figure 1 is a side elevation of the improved gopher trap showing the same set.

Fig. 2 is a perspective view of the gopher trap set.

Fig. 3 is a longitudinal section through the trap, and

Fig. 4 is a detail section through the trap illustrating part of the trip mechanism.

Referring more particularly to the drawings, wherein like characters indicate like and corresponding parts throughout the several views, the rod 10 of the trap has a plurality of longitudinally spaced laterally extending arms 11 formed thereon, the outer ends of which arms are curved, and have their terminals sharpened as shown at 12 to form piercing points for piercing an animal. This rod 10 extends longitudinally through a cylindrical housing 13 and it has a handle or rotating rod 14 carried by the end opposite to the end which carries the arms 11. This rod 14 extends diametrically through the rod 10 and is provided to permit rotating of the rod 10 for winding the spiral spring 15 one end of which is connected to the rod while the other end is connected to the cylindrical casing 13 as shown at 16. The rod 10 has a latch pin 17 extending diametrically therethrough, near the end of the housing 13 adjacent one of the arms 11 and this latch pin is adapted to be engaged by the enlarged end 18 of a pivotally mounted pawl 19. The pawl 19 is pivotally mounted upon a pin 20 which is in turn carried by a bracket structure 21 preferably formed upon the cylindrical shell or housing 13. The end of the pawl remote from the downturned end 18 curves upwardly, and is shaped for extending through a longitudinally extending slot 22 formed in an operating bolt 23. The terminal of the upwardly curving end of the pawl 19 is provided with a shoulder 24 adapted to engage against the outer edge of the top of the bracket structure 21 when the trap is set. The operating bolt 23 extends outwardly beyond the rearmost portion of the bracket structure 21, and it has a contractile spiral spring 25 connected thereto, which is also connected to the housing 13 as shown at 26, the normal tendency of this spring being to draw the operating bolt 23 outwardly to force the upwardly curving end of the pawl 19 downwardly for rocking the pawl to move the head end 18 out of engagement with the latch pin 17 to permit rotation of the rod 10 by action of the spring 15. However, the spring 25 is restrained from rocking the pawl 19 in the manner as specified, when the trap is set, by a pawl 27, which engages in a notch 28, formed in the operating bolt 23 as clearly shown in Fig. 3 of the drawings. This pawl 27 is carried by the trip pan or plate 29, which extends vertically from the bracket structure 21 and also the housing 13, curving slightly and consequently presenting a slight concaved face toward the end of the rod 10 which carries the laterally extending arms 11. This trip pan is pivotally mounted by means of the pivot pin 30 of the pawl 27, upon the bracket structure 21, and when in its normal forward or set position its weight, together with the contracting action of the spring 25 will tend to hold the edge of the pawl 27 in the recess 28, restraining movement of this pawl, and consequently preventing operation of the trap. The cylindrical casing 13 has a removable cap 31 upon its outer end, by means of which access to the interior of the housing may be gained, and it also has a sleeve 32 carried thereby, intermediate its ends, and extending transversely to the length of the cylindrical housing, the said sleeve being adapted to receive an anchoring pin 33 to anchor the trap in a set position. The bolt 23 has an upstanding thumb rest 34 to facilitate the manual movement of the bolt when setting the trap structure. In setting the trap, the trip mechanism is set, after it has been operated by forcing the operating bolt 23 forwardly tensioning the spring 25 and allowing the edge of the pawl 27 to engage the notch 28, the tendency of the pawl being to ride over the bolt 23, and consequently fall in the notch under its own weight or gravity action, and therefore when the trip mechanism is thus set, the unwinding rotation of the spring 15 will be prevented and the spring 15 is then wound or tensioned by rotating the rod 10 through the medium of the handle 14. By particular reference to Fig. 4 of the drawings, it will be noted that the said pin 17 has its ends beveled as illustrated at 35, for riding over the head end of the pawl 19 when setting or winding the spring, the said pawl having one edge correspondingly beveled as shown at 36 to permit this ridinig or idle movement of the pawl during the setting of the trap. It will be necessary only to rotate the rod 10 two or three revolutions, as such will impart sufficient tensioning to the spring 15 to operate the trap for catching or piercing rodents, and after the spring has been properly tensioned the trap will be set and ready for placing at the desired point to catch the rodent, the spring 15 being held against unwinding action by the engagement of the latch pin 17 with the pawl 19 as shown in Fig. 4 of the drawings.

In placing the trap, to catch a gopher or analogous rodent, a mound which is formed by the gopher when pushing the dirt out of his main tunnel or runway is found and it is opened with a scraper or analogous tool forming a passageway as indicated at Fig. 1 of the drawings, which has communication with the mound A and with the tunnel or passageway B. As clearly shown in the drawings, it will be noted that this passageway B is dug deeper than the deepest portion of the tunnel C, so as to permit the placing of the trap structure in such manner that the uppermost portion of the piercing tines 11 will be slightly below the bottom or lowermost portion of the tunnel or runway C, and the trap is then placed and anchored with the outermost piercing tine 11 under a portion of the tunnel, and the trap extending upwardly at an incline therefrom, the bottom of the passageway C being cut to incline upwardly from its inner and lowermost portion. After the trap is properly placed and anchored, loose dirt is placed over the rod 10 and the piercing tines 11 and against the concaved surface of the trip pan 29. According to its natural habits when the gopher discovers the opening in his tunnel he will immediately start to fill it up pushing the dirt in front of himself, to fill up this passageway B, and in pushing the dirt out of the tunnel C, into the passageway, he will as is his custom and as is natural push the dirt outwardly at the outer end of the passageway C, first then filling in in front of him. However, when pushing the dirt outwardly the pressure thereof against the trip pan 29 and the dirt against the concaved face thereof will rock this trip pan a sufficient distance to disengage the pawl 27 from the notch 28, allowing the spring 25 to contract, drawing the operating bolt 23 rearwardly therewith and rocking the pawl 19, moving the head end 18 thereof, upwardly out of engagement with the latch pin 17, which will release the spring 15. Upon release the spring 15 will move the rod 10 moving the tines 11 upwardly, in a rotary manner and over the rodent for piercing him and entrapping as well as killing him.

Changes in details may be made without departing from the spirit of this invention, but

I claim:

1. In a trap, the combination, of a rod, a plurality of animal piercing tines carried by said rod, a spring for rotating said rod, a latch pin extending diametrically from said rod, a pawl engaging said latch means for normally holding said spring under tension, and trip means for rocking said pawl to release said spring for rotating said rod.

2. In a trap, the combination, of a rod, a plurality of animal piercing tines carried by said rod, a spring for rotating said rod, a latch pin extending diametrically from said rod, a pawl engaging said latch means for normally holding said spring under tension, and trip means for rocking said pawl to release said spring for rotating said rod, a handle carried by said rod for rotating the rod to tension said spring, said latch pin and pawl constructed to permit rotation of the rod for tensioning the same and prevent rotation of the rod by unwinding of the spring except upon operation of said pawl out of engagement with said pin.

3. In a trap, the combination, of a rod, a plurality of piercing tines carried by said rod, a spring for rotating said rod, a housing inclosing said spring, a latch pin extending diametrically from said rod, a pawl pivotally supported by said housing and adapted to engage said latch pin to normally restrain the spring from unwinding rotation, and trip means for rocking said pawl to permit unwinding rotation of the said spring.

4. In a trap, the combination, of a rod, a plurality of piercing tines carried by said rod, a spring for rotating the rod, a housing inclosing said spring, a latch pin extending diametrically from said rod, a pawl pivotally supported by the housing and engaging said latch pin to restrain said spring from unwinding rotation, an operating bolt for rocking said pawl to permit the unwinding operation of said spring, and trip means controlling movement of said operating bolt.

5. In a trap, the combination, of a rod, a plurality of piercing tines carried by said rod, and extending transversely therefrom, a spring for rotating said rod, a housing inclosing said spring, a latch pin extending diametrically from said rod, a pawl pivotally carried by said housing and engaging said latch pin to normally restrain unwinding movement of said spring, an operating bolt for operating said pawl, a spring for connection to said operating bolt for normally urging it into a pawl operating position, and a second pawl engaging said bolt for restraining it against movement under action of said last named spring.

6. In a trap, the combination, of a rod, a plurality of piercing tines carried by said rod, and extending transversely therefrom, a spring for rotating said rod, a housing inclosing said spring, a latch pin extending diametrically from said rod, a pawl pivotally carried by said housing and engaging said latch pin to normally restrain unwinding movement of said spring, an operating bolt for operating said pawl, a spring for connection to said operating bolt for normally urging it into a pawl operating position, a second pawl engaging said bolt for restraining it against movement under action of said last named spring, and a trip pan connected to said last named pawl and adapted to be animal operated to release the pawl to permit movement of said operating bolt to rock said first named pawl to release the spring for unwinding action.

7. In a trap, the combination of a relatively long cylindrical housing, a rod extending longitudinally through and rotatably carried by the housing, the terminals of the rod extending outwardly from the opposite ends of the housing, a spring disposed in the housing and coiled around the rod and having its terminals secured respectively to the rod and to the housing, an operating handle carried by one end of the rod, piercing tines carried by the other end of the rod, trip means carried by the casing for preventing the normal rotation of the rod, and an anchor receiving sleeve carried by the casing, whereby the casing can be held against rotation under the influence of the spring.

FRANK PHILLIPS.